US011884346B2

(12) United States Patent  
Seiffer et al.

(10) Patent No.: US 11,884,346 B2  
(45) Date of Patent: Jan. 30, 2024

(54) MOTOR VEHICLE WITH DRIVEN WHEELS ON A NUMBER OF AXLES AND METHOD FOR CONTROLLING SAME

(71) Applicant: Schaeffler Technologies AG & Co. KG, Herzogenaurach (DE)

(72) Inventors: Alexander Seiffer, Karlsruhe (DE); Philipp Kautzmann, Karlsruhe (DE)

(73) Assignee: Schaeffler Technologies AG & Co. KG, Herzogenaurach (DE)

(*) Notice: Subject to any disclaimer, the term of this patent is extended or adjusted under 35 U.S.C. 154(b) by 233 days.

(21) Appl. No.: 17/431,530

(22) PCT Filed: Dec. 6, 2019

(86) PCT No.: PCT/DE2019/101054  
§ 371 (c)(1),  
(2) Date: Aug. 17, 2021

(87) PCT Pub. No.: WO2020/169134  
PCT Pub. Date: Aug. 27, 2020

(65) Prior Publication Data  
US 2022/0111892 A1 Apr. 14, 2022

(30) Foreign Application Priority Data  
Feb. 21, 2019 (DE) ...................... 10 2019 104 392.1

(51) Int. Cl.  
*G06F 17/00* (2019.01)  
*B62D 9/00* (2006.01)  
(Continued)

(52) U.S. Cl.  
CPC ............ *B62D 9/005* (2013.01); *B60K 17/356* (2013.01); *B60L 15/2009* (2013.01); *B62D 9/002* (2013.01); *G07C 5/02* (2013.01)

(58) Field of Classification Search  
CPC ...... B62D 9/005; B62D 9/002; B60K 17/356; B60L 15/2009; G07C 5/02; Y02T 10/72  
(Continued)

(56) References Cited

U.S. PATENT DOCUMENTS 5,301,769 A * 4/1994 Weiss ..................... B60K 23/04  
701/69  
5,335,746 A * 8/1994 Betz ....................... F16D 48/064  
180/242  
(Continued)

FOREIGN PATENT DOCUMENTS

CN 101484347 A 7/2009  
CN 103228522 A 7/2013  
(Continued)

OTHER PUBLICATIONS

Independent wheel torque control of 4WD electric vehicle for differential drive assisted steering (Year: 2011).*

*Primary Examiner* — Ronnie M Mancho

(57) ABSTRACT

A motor vehicle is controlled via a method, particularly for steering during a malfunction. Two wheels are arranged on a steerable axle of the motor vehicle and each can be driven by a single-wheel drive. At least one wheel is arranged on a non-steerable axle of the motor vehicle and can be driven by a wheel drive. In the event of a malfunction of one of the single-wheel drives being identified, a drive torque or a braking torque is generated with the functioning single-wheel drive of the wheel arranged on the steerable axle of the motor vehicle to steer the wheels arranged on the steerable axle in a specified direction. A drive torque or a braking torque is generated with the wheel drive of the wheel arranged on the non-steerable axle of the motor vehicle to at least partially bring about a specified longitudinal movement of the motor vehicle.

15 Claims, 1 Drawing Sheet

(51) Int. Cl.
  *B60K 17/356* (2006.01)
  *B60L 15/20* (2006.01)
  *G07C 5/02* (2006.01)
(58) Field of Classification Search
  USPC .......................................................... 701/22
  See application file for complete search history.

(56) References Cited

U.S. PATENT DOCUMENTS

| | | | | |
|---|---|---|---|---|
| 5,364,113 | A * | 11/1994 | Goertzen | B60G 17/0163 280/81.6 |
| 5,908,081 | A * | 6/1999 | Olson | B62D 9/00 180/419 |
| 6,038,500 | A * | 3/2000 | Weiss | B60W 10/18 701/41 |
| 8,527,177 | B2 * | 9/2013 | Linda | B60T 8/172 701/74 |
| 8,857,554 | B1 | 10/2014 | Keller | B62D 7/18 180/262 |
| 9,730,376 | B2 * | 8/2017 | Behra | A01D 41/02 |
| 10,925,216 | B1 * | 2/2021 | Brown | B60K 17/00 |
| 10,962,107 | B2 * | 3/2021 | Naito | F02D 41/0225 |
| 11,021,033 | B2 * | 6/2021 | Anderson | B60G 17/052 |
| 11,118,665 | B2 * | 9/2021 | Creech | F16H 48/40 |
| 11,280,391 | B2 * | 3/2022 | Engerman | F16H 3/006 |
| 11,607,952 | B1 * | 3/2023 | Wright | B60K 7/0007 |
| 2007/0051540 | A1 * | 3/2007 | Lawson | B62D 11/003 180/6.48 |
| 2009/0078494 | A1 * | 3/2009 | Dornhege | B62D 5/0472 180/446 |
| 2010/0307843 | A1 * | 12/2010 | Lawson, Jr. | B60K 17/356 180/242 |
| 2010/0324766 | A1 * | 12/2010 | Linda | B60W 40/076 701/22 |
| 2011/0160963 | A1 * | 6/2011 | Yasui | B62D 11/24 701/41 |
| 2013/0211683 | A1 * | 8/2013 | Philpott | B60T 7/16 701/70 |
| 2014/0188343 | A1 * | 7/2014 | Yoshimura | B60W 10/08 701/41 |
| 2014/0374185 | A1 * | 12/2014 | Fischer | B60K 7/0007 180/253 |
| 2015/0289437 | A1 * | 10/2015 | Behra | A01B 69/007 56/10.6 |
| 2017/0120753 | A1 * | 5/2017 | Kentley | B60W 30/02 |
| 2017/0313174 | A1 * | 11/2017 | von Koenigsegg | B60K 17/356 |
| 2019/0039651 | A1 * | 2/2019 | Brok | B62D 6/00 |
| 2019/0195327 | A1 * | 6/2019 | Creech | F16H 48/24 |
| 2020/0040967 | A1 * | 2/2020 | Engerman | B60K 17/165 |
| 2020/0096084 | A1 * | 3/2020 | Engerman | F16H 37/042 |
| 2021/0123363 | A1 * | 4/2021 | Krishnan | F16H 57/0452 |
| 2023/0048018 | A1 * | 2/2023 | Lapis | B62D 7/159 |

FOREIGN PATENT DOCUMENTS

| | | |
|---|---|---|
| CN | 107792164 A | 3/2018 |
| DE | 602004005009 T2 | 11/2007 |
| DE | 102013011883 A1 | 1/2015 |
| DE | 102014200608 A1 | 7/2015 |
| DE | 102014004231 A1 | 10/2015 |
| DE | 102014219673 A1 | 3/2016 |
| DE | 102016006466 A1 | 11/2017 |
| DE | 102016007445 A1 | 12/2017 |
| DE | 102016210126 A1 | 12/2017 |
| DE | 102016215793 A1 | 3/2018 |
| DE | 102016223360 A1 | 5/2018 |
| EP | 1886901 A1 | 2/2008 |
| EP | 2583882 A1 | 4/2013 |
| GB | 2274320 A * | 7/1994 ........... B60K 17/105 |
| WO | 2017198565 A1 | 11/2017 |

* cited by examiner

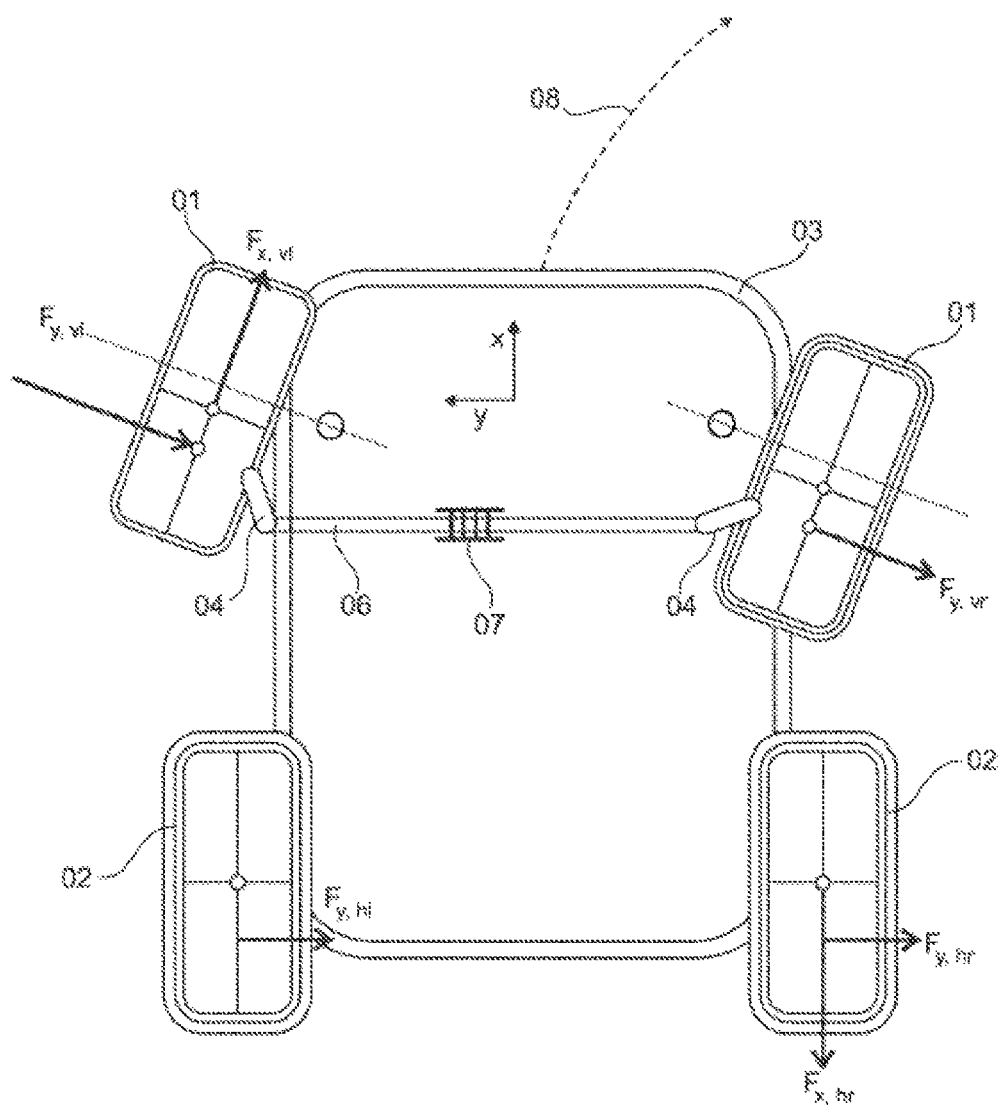

MOTOR VEHICLE WITH DRIVEN WHEELS ON A NUMBER OF AXLES AND METHOD FOR CONTROLLING SAME

CROSS-REFERENCE TO RELATED APPLICATIONS

This application is the U.S. National Phase of PCT Appln. No. PCT/DE2019/101054 filed Dec. 6, 2019, which claims priority to DE 10 2019 104 392.1 filed Feb. 21, 2019, the entire disclosures of which are incorporated by reference herein.

TECHNICAL FIELD

The present disclosure relates, firstly, to a method for controlling a motor vehicle that comprises several wheels. Two of the wheels are arranged on a steerable axle of the motor vehicle and may respectively be driven by an individual wheel drive. At least one of the wheels is arranged on a non-steerable axle of the motor vehicle and may be driven by a wheel drive. In addition, the disclosure relates to a motor vehicle of the said type.

BACKGROUND

DE 10 2016 210 126 A1 discloses a method for controlling a vehicle. The vehicle has at least one steered axle with driven wheels, and the driven wheels are driven via a wheel-selective drive. In addition, the vehicle has a steering system with a power steering apparatus and a first power steering module for activating the power steering apparatus and a second power steering module for activating the wheel-selective drive. An actuator module is used for activating the first and second power steering module; these are activated in such a way that an intermediate section of the steering system is held in elastic tension between the power steering apparatus and the driven wheels. The actuator module constitutes an apparatus for controlling the magnitude of the elastic tension as a manipulated variable.

From DE 10 2016 223 360 A1, a drive arrangement for a vehicle is known, comprising a chassis and a steered drive axle with two wheel units. Each of the wheel units has: a wheel, a wheel suspension for swinging the wheel about a steering axle, and an external drive motor having a rotor and a stator. The rotor is connected to the wheel, while the stator is supported by the wheel suspension. The stator is supported so that it may rotate within the wheel suspension. The stator is supported on a chassis in a rotationally rigid fashion.

DE 10 2016 215 793 A1 discloses a vehicle having a steering axle and having a steering apparatus for steering the steering axle. Via the steering apparatus, a steering wheel angle may be entered that gives rise to a turning angle of the wheels of the steering axle. A quotient of the steering wheel angle divided by the turning angle defines a steering ratio. The vehicle comprises a first drive that enables a wheel-selective distribution of a first drive torque among the wheels of the steering axle. The vehicle further comprises a drive axle and a second drive that enables a wheel-selective distribution of a second drive torque among the wheels of the drive axle. A control apparatus is used for receiving input variables, which are designed as driving-dynamics variables of the vehicle. These driving-dynamics variables make it possible to ascertain a change in the steering ratio. The control apparatus outputs, as an output variable, control information for distributing the drive torque of the second drive in order to reduce the change, or compensate for it completely, or update a setpoint value.

DE 10 2013 011 883 A1 teaches a method for operating a steering system in a two-track motor vehicle having: a steerable axle that has two steerable wheels; and a vehicle drive the drive torque of which may be distributed to the steerable wheels as wheel drive torques, as a function of a drive controller. A steering wheel rotation angle and an actual steering angle of one of the steerable wheels are made available in the form of electronic input signals for an electronic steering control unit (ECU). The steering wheel rotation angle is evaluated and a setpoint steering angle is calculated based on the steering wheel rotation angle. A difference is calculated, in magnitude and direction, between the actual steering angle and the setpoint steering angle. A control signal of the steering control unit is output to the drive control unit. The wheel drive torques are distributed to the steerable wheels as a left wheel drive torque and a right wheel drive torque in such a way as to achieve a reduction in the difference between the actual steering angle and the setpoint steering angle.

From DE 10 2014 200 608 A1, a method is known for controlling a motor vehicle, wherein the motor vehicle comprises several wheels. Two wheels are arranged on a steerable axle of the motor vehicle and may respectively be driven by an individual wheel drive wherein at least one of the wheels is arranged on a non-steerable axle of the motor vehicle and may be driven by a wheel drive. The method comprises the following steps. Detecting a malfunction of a power steering, consequently generating a drive torque or a braking torque with a fully functional individual wheel drive of the wheel arranged on the steerable axle of the motor vehicle in the case of a detected malfunction of the power steering in order to steer the wheels that are arranged on the steerable axle in a predetermined direction. Generating a drive torque or a braking torque with the wheel drive of the wheel that is arranged on the non-steerable axle of the motor vehicle, in order at least partially to effect a predetermined longitudinal movement of the motor vehicle.

SUMMARY

It is desirable to improve the control of a motor vehicle with selectively drivable wheels.

A method is used for controlling a motor vehicle, in particular for steering during a malfunction. The motor vehicle may, for example, consist of an automobile or a logistics platform or a riding lawn mower. The at least two-track motor vehicle comprises several wheels. The at least two-track motor vehicle preferably comprises at least three wheels, and more preferably at least four wheels. At least two of the wheels are arranged on a steerable axle of the motor vehicle and may respectively be driven by an individual wheel drive. At least one of the wheels is arranged on a non-steerable axle of the motor vehicle and can be driven by a wheel drive, which may consist of an individual wheel drive for this wheel or a shared drive for both wheels on the non-steerable axle. Preferably, both wheels on the non-steerable axle of the motor vehicle may respectively be driven by an individual wheel drive. Preferably, all of the wheels of the motor vehicle may respectively be driven by an individual wheel drive. The individual wheel drives and the wheel drive preferably consist of wheel hub drives or near-wheel drives, which are preferably electric motors. The individual wheel drives are designed to generate drive torques and braking torques that act on the respective wheel. The braking torques may be generated by an electric motor or by friction.

The wheels on the steerable axle are preferably coupled to one another by a steering system, wherein the wheels preferably have steering angles that are in a predetermined ratio that varies as a function of the steering angles. The steering system preferably comprises two steering levers on the two wheels or on suspensions of the wheels, wherein the steering levers are connected together by a rod, in particular by a steering rod or a rack.

Steering of the motor vehicle is preferably accomplished when the vehicle is in an error-free state as a result of the individual wheel drives of the wheels that are arranged on the steerable axle being used to transmit drive torques and/or braking torques to these wheels, which steer the wheels in a predetermined direction. The steering function is thus accomplished entirely through a corresponding distribution of drive torques and/or braking torques among the wheels that are arranged on the steerable axle. The motor vehicle therefore preferably does not comprise a steering actuator and also does not comprise any mechanical linkage between a steering wheel and the wheels. Accordingly, it is preferable that the motor vehicle is designed for steer-by-wire steering or for autonomous control.

The method is provided for the case in which one of the individual wheel drives of the wheels that are arranged on the steerable axle of the motor vehicle has a malfunction. This is the case, for example, when this individual wheel drive has failed completely or is only able to generate a reduced drive torque or braking torque. In this case, the steering function is no longer given because the difference between the drive torques and braking torques effecting the steering function and the sum of the driving and braking torques effecting longitudinal tracking can no longer be regulated completely independently of one another.

In one step of the method, the malfunction of one of the individual wheel drives of the wheels that are arranged on the steerable axle of the motor vehicle is detected. This may be detected, for example, from the fact that the motor vehicle is not moving in a predetermined direction due to the malfunction. This predetermined direction is determined, for example, by the position of a steering wheel that a driver of the motor vehicle operates. This direction may however also be determined by an autonomous driving system.

If a malfunction has been detected of one of the individual wheel drives of the wheels that are arranged on the steerable axle of the motor vehicle, another one of the individual wheel drives of the wheels that are arranged on the steerable axle remains fully functional. This individual wheel drive is fully functional if it may still be controlled in order to generate a drive torque or a braking torque. Otherwise, the function of this individual wheel drive may be restricted.

In the event of a detected malfunction of one of the individual wheel drives of the wheels that are arranged on the steerable axle of the motor vehicle, a drive torque or a braking torque is generated with the functional individual wheel drive of the wheel that is arranged on the steerable axle of the motor vehicle in order to steer the wheels that are arranged on the steerable axle in a predetermined direction, i.e., in order to effect a desired steering movement. The drive torque or the braking torque acts on the corresponding wheel as a result of which the tracks of the motor vehicle are driven unevenly and a torque that deflects the wheels that are arranged on the steerable axle is generated in a vertical axis. A drive torque or a braking torque is selected as a function of which side the fully functional individual wheel drive is located on and whether it is desired that the motor vehicle be steered to the right or left. If the fully functional individual wheel drive is, for example, on the left side of the motor vehicle and the motor vehicle is intended to be steered to the right, the fully functional individual wheel drive is activated in such a way that it generates a drive torque.

In addition, a drive torque or a braking torque is generated with the wheel drive of the wheel that is arranged on the non-steerable axle of the motor vehicle in order to at least partially effect a predetermined longitudinal movement of the motor vehicle. A drive torque or a braking torque is selected as a function of whether the motor vehicle is to be accelerated or braked, i.e., what speed it is desired to achieve in the longitudinal direction. The longitudinal movement is determined, for example, by a gas pedal or accelerator pedal and a brake pedal, which are operated by a driver of the motor vehicle. The longitudinal movement may also be determined via an autonomous driving system. As a result, the motor vehicle travels in the predetermined direction even if one of the individual wheel drives has a malfunction.

Generating the drive torque or the braking torque with the fully functional individual wheel drive of the wheel that is arranged on the steerable axle of the motor vehicle and generating the drive torque or the braking torque with the wheel drive of the wheel that is arranged on the non-steerable axle of the motor vehicle preferably take place simultaneously.

Preferably, a drive torque or a braking torque is generated with the wheel drive of the wheel that is arranged on the non-steerable axle of the motor vehicle in order to completely effect the predetermined longitudinal movement of the motor vehicle.

If the wheel drive of the wheel that is arranged on the non-steerable axle of the motor vehicle consists of an individual wheel drive and both of the wheels that are arranged on the non-steerable axle of the motor vehicle may respectively be driven by an individual wheel drive, a drive torque or a braking torque is preferably generated with the respective individual wheel drives of both of the wheels that are arranged on the non-steerable axle of the motor vehicle in order to effect, at least partially or preferably completely, the predetermined longitudinal movement of the motor vehicle.

A particular advantage of the method consists in the fact that the steering functionality of the motor vehicle may be assured even in the case of failure of one of the individual wheel drives of the wheels that are arranged on the steerable axle of the motor vehicle, as a result of which, driving safety is enhanced.

In preferred embodiments, the generating of a drive torque or a braking torque with the functional individual wheel drive of the wheel that is arranged on the steerable axle of the motor vehicle and the generating of a drive torque or a braking torque with the wheel drive of the wheel that is arranged on the non-steerable axle of the motor vehicle additionally also take place in order to effect, at least partially, a predetermined yaw moment on the motor vehicle.

Depending on which side the malfunctioning individual wheel drive is on, as well as the predetermined direction and the predetermined longitudinal movement, the drive torque or braking torque that is generated by the fully functional individual wheel drive may contribute to or detract from the predetermined longitudinal movement in order to steer the wheels that are arranged on the steerable axle into the predetermined direction. Consequently, different situations may arise. In one case, a drive torque is respectively generated with the fully functional individual wheel drive of the wheel that is arranged on the steerable axle of the motor vehicle, and with the wheel drive of the wheel that is arranged on the non-steerable axle of the motor vehicle. In another case, a braking torque is respectively generated with the fully functional individual wheel drive of the wheel that is arranged on the steerable axle of the motor vehicle, and with the wheel drive of the wheel that is arranged on the non-steerable axle of the motor vehicle. In another case, a drive torque is generated with the fully functional individual wheel drive of the wheel that is arranged on the steerable axle of the motor vehicle while a braking torque is generated with the wheel drive of the wheel that is arranged on the non-steerable axle of the motor vehicle. In another case, a braking torque is generated with the fully functional individual wheel drive of the wheel that is arranged on the steerable axle of the motor vehicle while a drive torque is generated with the wheel drive of the wheel that is arranged on the non-steerable axle of the motor vehicle.

The motor vehicle preferably further comprises a controllable braking device for braking a steering movement of the wheels that are arranged on the steerable axle. The steering movement may be braked and blocked via the braking device. If the braking device is not actuated, the steering movement is preferably unrestricted such that the wheels are steered by the drive torques and braking torques that act on the wheels. The steering movement is unrestricted insofar as it is not effected or limited by a steering actuator or by a mechanical linkage with a steering wheel. The controllable braking device does not actively generate a steering torque or a steering movement. The controllable braking device may only passively brake or block a steering movement that is effected in another way.

As soon as the wheels that are arranged on the steerable axle have been steered in the predetermined direction by generating a drive torque or a braking torque with the functional individual wheel drive of the wheel arranged on the steerable axle of the motor vehicle, the braking device is preferably activated so as to prevent further steering movement. Thus, the steering angle is fixed once the wheels that are arranged on the steerable axle have been steered in the predetermined direction. As a result, the wheels that are arranged on the steerable axle are steered in the predetermined direction even if one of the individual wheel drives has a malfunction.

Preferred embodiments of the method comprise an additional step that is carried out once the braking device has been activated, in order to prevent further steering movement; i.e., once the steering angle has been fixed. In this additional step, a drive torque or a braking torque is generated with the fully functional individual wheel drive of the wheel that is arranged on the steerable axle of the motor vehicle, in addition to the wheel drive of the wheel arranged on the non-steerable axle of the motor vehicle, in order to at least partially, or preferably completely, effect a predetermined longitudinal movement of the motor vehicle.

Additional preferred embodiments comprise a step in which the braking device is activated in order to partially brake, but not prevent, the steering movement while, in the event of a detected malfunction of one of the individual wheel drives, the generation of a drive torque or a braking torque is accomplished using the fully functional individual wheel drive in order to steer the wheels that are arranged on the steerable axle in the predetermined direction. These embodiments are preferred if the torque required for the longitudinal movement is greater than the torque required for steering.

The controllable braking device is preferably designed to effect a blocking of the steering movement of the wheels that are arranged on the steerable axle. In simple preferred embodiments, the controllable braking device in the non-actuated state completely unblocks the steering movement while, in the actuated state, it completely blocks the steering movement. In additional preferred embodiments, the controllable braking device effects a variable braking force or a variable braking torque for braking the steering movement of the wheels that are arranged on the steerable axle. The variable braking force or variable braking torque represents a compensation force or compensation torque for the forces and/or torques that act on the wheels that are arranged on the steerable axle of the motor vehicle.

If the steering system comprises a rod, in particular a steering rod or rack, the controllable braking device for braking a steering movement preferably acts on this displaceable rod, which transmits a steering movement to the wheels that are arranged on the steerable axle. Thus, the controllable braking device brakes the displacement of this rod.

If the steering system comprises, for example, rotatable components for changing the steering angle, the controllable braking device for braking a steering movement preferably effects a braking torque in order to brake a steering rotation of the wheels that are arranged on the steerable axle.

If the malfunctioning individual wheel drive of the wheel arranged on the steerable axle of the motor vehicle has not failed completely, but has limited function, i.e., it is able to generate a reduced drive torque or braking torque, this torque is preferably also used to steer the wheels that are arranged on the steerable axle into the specified direction, and also preferably to effect the predetermined longitudinal movement of the motor vehicle. The above-mentioned steps of the method are carried out because the reduced drive torque or braking torque may be so low that the wheels arranged on the steerable axle cannot be steered completely into the predetermined direction.

A case may arise in which the malfunction of the individual wheel drive of the wheel arranged on the steerable axle of the motor vehicle causes the wheel to generate a drag torque that acts opposite the steering rotation direction. In this case, it is necessary for the fully functional individual wheel drive of the wheel arranged on the steerable axle of the motor vehicle to generate a correspondingly larger drive torque or braking torque.

The controllable braking device preferably acts electromagnetically, magnetically or hydraulically. It may for example be a friction brake or a magnetic brake.

The motor vehicle comprises several wheels, wherein two of the wheels are arranged on a steerable axle of the motor vehicle and may respectively be driven by an individual wheel drive. At least one of the wheels is arranged on a non-steerable axle of the motor vehicle and may be driven by a wheel drive. The motor vehicle additionally comprises a control unit for controlling the individual wheel drives and the wheel drive. The control unit is configured to carry out the method as described above. The control unit is preferably configured to carry out one of the above-described preferred embodiments of the method. The control unit preferably is also used for controlling the braking device.

BRIEF DESCRIPTION OF THE DRAWINGS

Additional advantages, details, and further developments will become apparent from the below description of a preferred embodiment, with reference to the drawing. The sole FIGURE is a schematic representation of a vehicle.

DETAILED DESCRIPTION

The sole FIGURE shows a schematic representation of two front wheels 01 on a steerable axle and two back wheels 02 on a non-steerable axle of a motor vehicle 03 during one step of a preferred embodiment of a method. The two front wheels 01 on the steerable axle and the two back wheels 02 on the non-steerable axle of the motor vehicle 03 may be driven respectively by individual wheel drives (not shown). The steering movement of the front wheels 01 is linked together via steering levers 04 and a steering rod 06. The motor vehicle 03 includes a controllable braking device 07 for braking a steering movement of the front wheels 01. The controllable braking device 07 acts on the steering rod 06 and may block a displacement of the steering rod 06 in the y-direction.

The method is provided for the case in which one of the individual wheel drives (not shown) of the front wheels 01 on the steerable axle of the motor vehicle 03 has a malfunction. In the example shown, the individual wheel drive (not shown) of the front wheel 01 arranged on the right side of the steerable axle of the motor vehicle 03 has failed such that the right front wheel 01 cannot be driven.

In the example shown, a drive torque is generated with the individual wheel drive (not shown) of the front wheel 01 that is arranged on the left side on the steerable axle of the motor vehicle 03 in order to steer the front wheels 01 in a desired direction 08. Correspondingly, a force $F_{x,vl}$ acts on the left front wheel 01. In the y direction, a force $F_{y,vl}$ acts on the front left wheel 01, and a force $F_{y,vr}$ acts on the front right wheel 01.

In the example shown, a braking torque is generated with the individual wheel drive (not shown) of the back wheel 02 that is arranged on the right side of the non-steerable axle of the motor vehicle 03 in order to effect a predetermined longitudinal movement of the motor vehicle 03. Correspondingly, a force $F_{x,hr}$ acts on the right back wheel 02. In the y direction, a force $F_{y,hl}$ acts on the back left wheel 02, and a force $F_{y,hr}$ acts on the back right wheel 02.

LIST OF REFERENCE SYMBOLS

01 front wheel
02 back wheel
03 motor vehicle
04 steering lever
05 —
06 steering rod
07 controllable braking device
08 direction

The invention claimed is:

1. A method for controlling a motor vehicle, wherein the motor vehicle comprises several wheels, wherein two of the several wheels are arranged on a steerable axle of the motor vehicle and are respectively driven by individual wheel drives; wherein at least one of the several wheels is arranged on a non-steerable axle of the motor vehicle and is driven by an individual wheel drive; and wherein the method comprises the following steps:

detecting a malfunction of one of the individual wheel drives of the wheels that are arranged on the steerable axle of the motor vehicle, wherein another of the individual wheel drives of the wheels arranged on the steerable axle of the motor vehicle is still fully functional;

in response to the detected malfunction, generating a drive torque or a braking torque with the functional individual wheel drive of the wheel that is arranged on the steerable axle of the motor vehicle in order to steer the wheels arranged on the steerable axle in a predetermined direction; and in response to the detected malfunction, generating a drive torque or a braking torque with the wheel drive of the wheel that is arranged on the non-steerable axle of the motor vehicle in order to at least partially effect a predetermined longitudinal movement of the motor vehicle.

2. The method according to claim 1, wherein the generating of a drive torque or a braking torque with the functional individual wheel drive of the wheel that is arranged on the steerable axle of the motor vehicle and the generating of a drive torque or a braking torque with the wheel drive of the wheel that is arranged on the non-steerable axle of the motor vehicle additionally also take place in order to effect, at least partially, a predetermined yaw moment on the motor vehicle.

3. The method according to claim 1, wherein:
a drive torque is respectively generated with the fully functional individual wheel drive of the wheel that is arranged on the steerable axle of the motor vehicle and with the wheel drive of the wheel that is arranged on the non-steerable axle of the motor vehicle.

4. The method according to claim 1, wherein the motor vehicle additionally has a controllable braking device for braking a steering movement of the wheels that are arranged on the steerable axle of the motor vehicle, wherein the method further comprises:

activating the braking device to prevent any further steering movement once the wheels that are arranged on the steerable axle have been steered in the predetermined direction.

5. The method according to claim 4, wherein, once the braking device has been activated in order to prevent any further steering movement, a drive torque or a braking torque is generated with the fully functional individual wheel drive of the wheel that is arranged on the steerable axle of the motor vehicle in order to at least partially effect the predetermined longitudinal movement of the motor vehicle.

6. The method according to claim 4, wherein the controllable braking device effects a blocking of the steering movement of the wheels that are arranged on the steerable axle of the motor vehicle.

7. The method according to claim 4, wherein the controllable braking device effects a variable braking force or a variable braking torque for braking the steering movement of the wheels that are arranged on the steerable axle of the motor vehicle.

8. The method according to claim 4, wherein the controllable braking device for braking a steering movement acts on a displaceable rod that transmits a steering movement to the wheels that are arranged on the steerable axle of the motor vehicle.

9. The method according to claim 4, wherein the controllable braking device for braking a steering movement effects a braking torque in order to brake a steering rotation of the wheels arranged on the steerable axle of the motor vehicle.

10. A motor vehicle with several wheels, wherein two of the wheels are arranged on a steerable axle of the motor vehicle and each of the two wheels is respectively driven by an individual wheel drive, wherein at least one of the wheels is arranged on a non-steerable axle of the motor vehicle and driven by a wheel drive, and wherein the motor vehicle additionally comprises a control unit for controlling the individual wheel drives and the controller is configured for;

detecting a malfunction of one of the individual wheel drives of the wheels that are arranged on the steerable axle of the motor vehicle, wherein another of the individual wheel drives of the wheels arranged on the steerable axle of the motor vehicle is still fully functional;

generating a drive torque or a braking torque with one of the functional individual wheel drives of the wheel that is arranged on the steerable axle of the motor vehicle in order to steer the wheels arranged on the steerable axle in a predetermined direction; and generating a drive torque or a braking torque with the wheel drive of the wheel that is arranged on the non-steerable axle of the motor vehicle in order to as least partially effect a predetermined longitudinal movement of the motor vehicle.

11. The method according to claim 1, wherein:
a braking torque is respectively generated with the fully functional individual wheel drive of the wheel that is arranged on the steerable axle of the motor vehicle and with the wheel drive of the wheel that is arranged on the non-steerable axle of the motor vehicle.

12. The method according to claim 1, wherein:
a drive torque is generated with the fully functional individual wheel drive of the wheel that is arranged on the steerable axle of the motor vehicle, and a braking torque is generated with the wheel drive of the wheel that is arranged on the non-steerable axle of the motor vehicle.

13. The method according to claim 1, wherein:
a braking torque is generated with the fully functional individual wheel drive of the wheel that is arranged on the steerable axle of the motor vehicle, and a drive torque is generated with the wheel drive of the wheel that is arranged on the non-steerable axle of the motor vehicle.

14. A motor vehicle comprising:
a first steerable wheel driven by a first wheel motor;
a second steerable wheel driven by a second wheel motor;
an unsteerable wheel driven by a third wheel motor; and
a controller configured to detect a failure of the first wheel motor and respond by commanding a first torque from the second wheel motor and a second torque from the third wheel motor to induce a predefined steering angle and a predefined longitudinal force.

15. The motor vehicle of claim 14 further comprising a steering brake configured to selectively hold the first and second steerable wheels at the predefined steering angle and wherein the controller is further configured to command the steering brake to engage after inducing the predefined steering angle.

\* \* \* \* \*